US008924334B2

(12) United States Patent
Lacey et al.

(10) Patent No.: US 8,924,334 B2
(45) Date of Patent: Dec. 30, 2014

(54) METHOD AND SYSTEM FOR GENERATING A SURGICAL TRAINING MODULE

(75) Inventors: Gerard Lacey, County Wicklow (IE); Donncha Mary Ryan, Dublin (IE); Derek Cassidy, County Cavan (IE); John Griffin, Kilkenny (IE); Laurence Griffin, Kilkenny (IE)

(73) Assignee: CAE Healthcare Inc., Saint-Laurent, Quebec ( * ) Notice: Subject to any disclaimer, the term of this patent is extended or adjusted under 35 U.S.C. 154(b) by 1833 days.

(21) Appl. No.: 11/660,098

(22) PCT Filed: Aug. 12, 2005

(86) PCT No.: PCT/IE2005/000081
§ 371 (c)(1),
(2), (4) Date: Feb. 5, 2008

(87) PCT Pub. No.: WO2006/016348
PCT Pub. Date: Feb. 16, 2006

(65) Prior Publication Data
US 2008/0147585 A1    Jun. 19, 2008

Related U.S. Application Data

(60) Provisional application No. 60/601,131, filed on Aug. 13, 2004.

(51) Int. Cl.
| | | |
|---|---|---|
| G06N 5/00 | (2006.01) | |
| G06F 1/00 | (2006.01) | |
| G09B 23/28 | (2006.01) | |
| G09B 7/00 | (2006.01) | |
| G09B 9/00 | (2006.01) | |

(52) U.S. Cl.
CPC  *G09B 23/28* (2013.01); *G09B 7/00* (2013.01); *G09B 9/00* (2013.01)
USPC ............................. 706/47; 704/270; 702/19

(58) Field of Classification Search
None
See application file for complete search history.

(56) References Cited

U.S. PATENT DOCUMENTS

| 4,764,883 A | 8/1988 | Nakagawa et al. ........... 364/513 |
|---|---|---|
| 5,149,270 A | 9/1992 | McKeown |

(Continued)

FOREIGN PATENT DOCUMENTS

| GB | 2288686 A | 10/1995 |
|---|---|---|
| GB | 2338582 A | 12/1999 |

(Continued)

OTHER PUBLICATIONS

Auer, T. et al., The Integration of Optical and Magnetic Tracking for Multi-User Augmented Reality, Computers and Graphics, 1999, pp. 805-808, vol. 23.

(Continued)

*Primary Examiner* — Jeffrey A Gaffin
*Assistant Examiner* — Kalpana Bharadwaj
(74) *Attorney, Agent, or Firm* — BCF LLP

(57) ABSTRACT

A system (1) comprises a physical surgical simulator (11) which transmits data concerning physical movement of training devices to an analysis engine (12). The engine (12) automatically generates rules for a rule base (13a) in a learning system (13). The learning system (13) also comprises content objects (13b) and 3D scenario objects (13c). A linked set of a 3D scenario object (13c), a rule base (13a), and a content object (13b) are together a lesson (10). Another simulator (14) is operated by a student. This transmits data concerning physical movement of training devices by a student to a verification engine (15). The verification engine (15) interfaces with the rule base (13a) to display the lesson in the manner defined by the lesson rule base (13a). It calculates performance measures defined in the lesson rule base (13a). It also records the performance measures into a lesson record (18) and it adapts the display of the lesson in line with the parameters defined in the lesson rule base (13a).

19 Claims, 4 Drawing Sheets

(56) References Cited

U.S. PATENT DOCUMENTS

| | | | |
|---|---|---|---|
| 5,414,649 A * | 5/1995 | Tse et al. ..................... | 703/6 |
| 5,623,582 A | 4/1997 | Rosenberg | |
| 5,662,111 A | 9/1997 | Cosman | |
| 5,740,802 A | 4/1998 | Nafis et al. | |
| 5,766,016 A | 6/1998 | Sinclair et al. | |
| 5,769,640 A | 6/1998 | Jacobus et al. | |
| 5,882,206 A | 3/1999 | Gillio | |
| 5,947,743 A | 9/1999 | Hasson | |
| 6,288,785 B1 | 9/2001 | Frantz et al. | |
| 6,323,837 B1 | 11/2001 | Rosenberg ..................... | 345/156 |
| 6,336,812 B1 | 1/2002 | Cooper et al. ................ | 434/267 |
| 6,361,323 B1 | 3/2002 | Beach et al. | |
| 6,368,332 B1 | 4/2002 | Salcudean et al. | |
| 6,459,481 B1 | 10/2002 | Schaack | |
| 6,468,265 B1 | 10/2002 | Evans et al. | |
| 6,485,308 B1 | 11/2002 | Goldstein | |
| 6,654,000 B2 | 11/2003 | Rosenberg | |
| 6,659,776 B1 | 12/2003 | Aumann et al. | |
| 6,739,877 B2 | 5/2004 | Bailey et al. | |
| 6,863,536 B1 | 3/2005 | Fisher et al. | |
| 6,939,138 B2 | 9/2005 | Chosack et al. | |
| 2001/0016804 A1 | 8/2001 | Cunningham | |
| 2001/0034480 A1 | 10/2001 | Rasche et al. | |
| 2003/0023444 A1 * | 1/2003 | St. John ..................... | 704/270.1 |
| 2003/0031992 A1 | 2/2003 | Laferriere et al. | |
| 2004/0019274 A1 | 1/2004 | Galloway et al. | |
| 2004/0030245 A1 | 2/2004 | Noble et al. | |
| 2004/0106916 A1 | 6/2004 | Quaid et al. | |
| 2004/0142314 A1 | 7/2004 | Hasson et al. | |
| 2005/0084833 A1 | 4/2005 | Lacey et al. | |
| 2005/0093889 A1 | 5/2005 | Sauer et al. | |
| 2005/0142525 A1 | 6/2005 | Cotin et al. | |
| 2005/0233810 A1 * | 10/2005 | Chiang ........................ | 463/42 |
| 2006/0019228 A1 | 1/2006 | Riener et al. | |
| 2006/0136183 A1 * | 6/2006 | Choquet ....................... | 703/11 |
| 2007/0238081 A1 | 10/2007 | Koh | |
| 2007/0275359 A1 | 11/2007 | Rotnes et al. | |
| 2008/0135733 A1 | 6/2008 | Feilkas et al. | |
| 2008/0312529 A1 | 12/2008 | Amiot et al. | |
| 2009/0215011 A1 | 8/2009 | Christensen et al. | |
| 2009/0246747 A1 | 10/2009 | Buckman et al. | |
| 2010/0248200 A1 | 9/2010 | Ladak et al. | |

FOREIGN PATENT DOCUMENTS

| | | |
|---|---|---|
| WO | WO95/02233 | 1/1995 |
| WO | WO98/15234 | 4/1998 |
| WO | WO99/42978 | 8/1999 |
| WO | WO02/059859 | 8/2002 |
| WO | WO02/100285 | 12/2002 |

OTHER PUBLICATIONS

Cover, S. A. et al., Interactively Deformable Models for Surgery Simulation, IEEE Computer Graphics and Applications, Nov. 1993, pp. 68-75.

Petrov, M. et al., Optical 3D Digitizers: Bringing Life to the Virtual World, IEEE Computer Graphics and Applications, May-Jun. 1998, pp. 28-37.

Ribo, M. et al., A New Optical Tracking System for Virtual and Augmented Reality Applications, IEEE Instrumentation and Measurement, Technology Conference, Budapest Hungary, May 21-23, 2001, pp. 1932-1936.

Rovetta, A., Graphic Interface in Telerobotics: Utilization for Surgery and Training, Proceedings of the IEEE International Conference on Robotics and Automation, May 1995, pp. 2389-2393.

Ward, J.W. et al., The Development of an Arthroscopic Surgical Simulator with Haptic Feedback, Future Generations Computer Systems, 1998, pp. 243-251, vol. 14.

U.S. Appl. No. 12/318,602, entitled "Surgical Training Simulator Having Multiple Tracking Systems," filed Dec. 31, 2008.

U.S. Appl. No. 12/318,601, entitled "Tracking and Training System for Medical Procedures," filed Dec. 31, 2008.

U.S. Appl. No. 12/318,600, entitled "Surgical Training Simulator," filed Dec. 31, 2008.

U.S. Appl. No. 12/318,599, entitled "Surgical Training Simulator Having Augmented Reality," filed Dec. 31, 2008.

Cao, C.G.L., et al., Task and Motion Analyses in Endoscopic Surgery, $5^{th}$ Annual Symposium on Haptic Interfaces for Virtual Environments and Teleoperation Systems, 1996 ASME, pp. 583-590.

Cauraugh, J.H., et al., Modeling Surgical Expertise for Motor Skill Acquisition, Am. J. Surg., 1999, 177:331-336, p. 331-336.

Dubois, P., et al., In vivo Measurement of Surgical Gestures, IEEE Transactions on Biomedical Engineering, Jan. 2002, vol. 49, No. 1, pp. 49-54.

Emam, T.A. et al., Differences Between Experts and Trainees in the Motion Pattern of the Dominant Upper Limb During Intracorporeal Endoscopic Knotting, Digestive Surgery, 2000, 17:120-125.

Payandeh, S., et al., On Defining Metrics for Assessing Laparoscopic Surgical Skills in a Virtual Training Environment, Studies in Health Technology and Informatics—Medicine Meets Virtual Reality, 2002, 85:334-340.

Rosen, J., et al., Hidden Markov Models of Minimally Invasive Surgery, Studies in Health Technology and Informatics—Medicine Meets Virtual Reality, Jan. 2000, 70:279-285.

IBM Technical Disclosure Bulletin, vol. 28, Issue 11, p. 4763, Apr. 1, 1986. Retrieved from IBM TDB Database, TDB-ACC-No. NN86044763.

Shahidi, R. et al., Volumetric Guidance via a Stereotactic Endoscope, Lecture Notes in Computer Science, Medical Image Computing and Computer-Assisted Intervention. MICCAI '98, vol. 1496, 1998. pp. 241-252.

* cited by examiner

METHOD AND SYSTEM FOR GENERATING A SURGICAL TRAINING MODULE

This is a national stage of PCT/IE05/000081 filed Aug. 12, 2005 and published in English, claiming benefit of U.S. provisional application No. 60/601,131, filed Aug. 13, 2004.

INTRODUCTION

1. Field of the Invention

The invention relates to generation of a surgical training module.

2. Prior Art Discussion

In surgical training for laproscopic surgery student surgeons train on physical simulators such as that described in U.S. Pat. No. 6,336,812 or U.S. Pat. No. 6,323,837. These devices can be used to provide assessment of the hand-eye coordination. However because many of the skills are implicit e.g. "respect for tissues" it is extremely difficult for an expert to develop learning materials and assessments for the students without significant investments in time and effort. Once developed, it is difficult for the expert to disseminate the learning materials to students and colleagues.

The invention addresses these problems.

SUMMARY OF THE INVENTION

According to the invention there is provided a system for generating a training module, the system comprising:
- an analysis engine for receiving motion data from a training simulator, for monitoring motion of an expert performing an exercise using the simulator, and for automatically generating a rule base representing rules adhered to by the expert in performing the exercise according to said monitoring; and
- a learning system for coupling the rule base with training content to provide a training module.

Therefore, the expert can drive generation of the training module by simply performing the task himself, using a simulator just as the student will do when performing exercises. The automatically-generated rule base captures the inherent rules which the expert (possibly sub-consciously) adheres to.

In one embodiment, the learning system couples the training content and the rule base with a 3D scenario object to complete a training module. This represents the scene, allowing excellent versatility in choice and nature of the scene.

In one embodiment, the system further comprises a development interface linked with the learning system, and wherein said 3D scenario object is received via the development interface. This advantageously allows the expert to modify the lesson and to choose the training scene.

In another embodiment, the training module comprises a set of associated objects which operate according to computer object-oriented methodology. This advantageously allows a versatile lesson storage and manipulation structure in the learning system. It also allows excellent modularity.

In one embodiment, the analysis engine automatically identifies spatial regions of interest of movement caused by an expert using the simulator. By identifying such regions the analysis engine tailors the rule base to be more detailed in the more important spatial regions in which a student should train. An example is the local spatial region around an instrument tip for suturing. In one embodiment, the analysis engine executes an automatic clustering technique to identify a region of interest.

In one embodiment, the analysis engine performs automatic pattern analysis to segment a lesson according to motion parameters. Pattern analysis is very effective at extracting the movements of an expert which are often performed sub-consciously or at least without much thought. By capturing such pattern data the system is in a position to generate rules which are specific in important training aspects. In one embodiment, the motion parameters are velocity change and spatial change. In one embodiment, the analysis engine executes a classifier to classify patterns, and the classifier may advantageously be based on a Hidden Markov Model.

In one embodiment, the development interface allows expert editing of the training module. This allows an advantageous combination of automatically-generated rules and modified rules which reflect those aspects which the expert regards as beneficial arising from his experience at training students. In one embodiment, the development interface generates a visual display of spatial regions, and allows modification of the spatial regions.

In a further embodiment, the system further comprises a verification engine for receiving motion data from a training simulator, and for evaluating, against said rule base, student performance of an exercise. This allows the student to perform the exercise in the same manner as the expert and achieve immediate verification responses which have the benefit of the expert's manner of performing the task but without the expert being present. In one embodiment, the verification engine verifies the student performance by extracting motion measures from the rule base, monitoring values for the corresponding motion by a student and comparing them.

In one embodiment, the verification engine saves the monitored performance data in lesson records. These can be replayed later for both the benefit of the student or for the expert.

In one embodiment, the verification engine generates a display of the training scene according to the rule base. This advantageously illustrates the context of the verification responses.

In one embodiment, the system further comprises a feedback engine for interactively interfacing with an expert and with a student to provide expert feedback to a student. This provides a further degree of student feedback in addition to what is automatically provided by the verification engine. In one embodiment, the feedback engine plays a video sequence of a student task and records tutor feedback during said playing.

In one embodiment, media for the video sequence is retrieved from lesson records saved by the verification engine. This advantageously allows offline expert feedback.

In one embodiment, the feedback is linked with a time on a play-bar visual indicator automatically generated by the feedback engine. This allows excellent control by a student to review expert feedback of his or her choice. In one embodiment, the feedback engine records multiple feedback items, each having an associated time on the play-bar. In one embodiment, the system initiates playing of the sequence at a student-selected time on the play-bar.

In one embodiment, the feedback includes a visual overlay on the video sequence, and/or a textual comment, and/an audio comment.

DETAILED DESCRIPTION OF THE INVENTION

Brief Description of the Drawings

The invention will be more clearly understood from the following description of some embodiments thereof, given by way of example only with reference to the accompanying drawings in which:—

DESCRIPTION OF THE EMBODIMENTS

Figure 1:
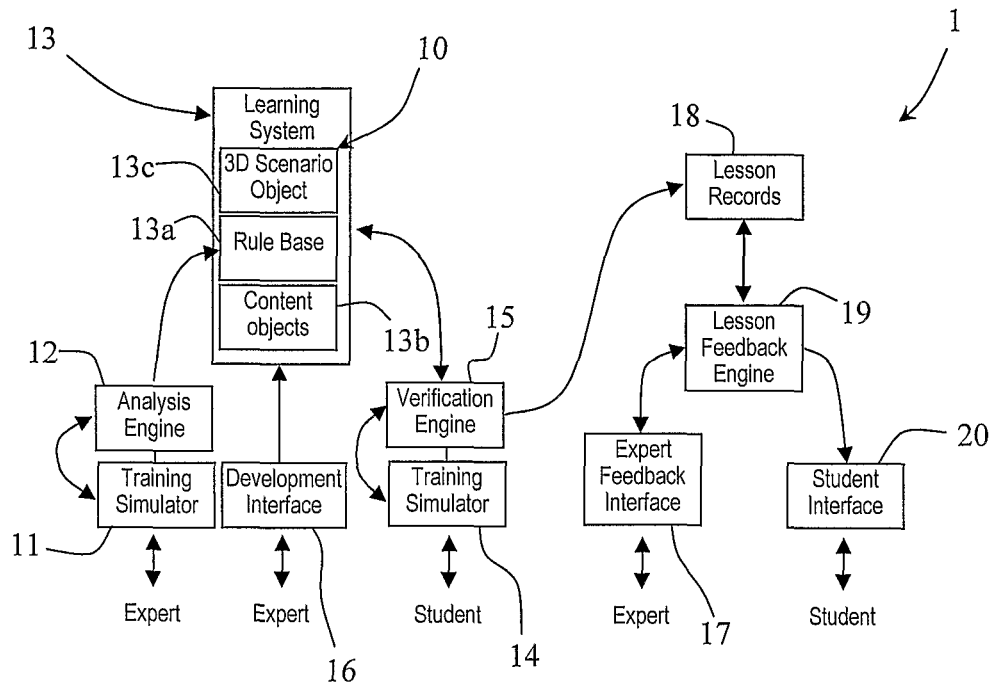
FIG. 1 is a block diagram of a system of the invention.

Referring to FIG. 1 a method for generating a surgical training module or lesson is implemented by a system 1. The system 1 comprises a physical surgical simulator 11 of the type described in our International Patent Specification No. WO03096307. The simulator 11 transmits data concerning physical movement of training devices to an analysis engine 12.

The engine 12 automatically generates rules for a rule base 13a in a learning system 13. The learning system 13 also comprises content objects 13b and 3D scenario objects 13c. A linked set of a 3D scenario object 13c, a rule base 13a, and a content object 13b are together a lesson 10. A development interface 16 provides for interactive input by an expert using a GUI, for modification or loading of a rule base 13a, a content object 13b and/or a 3D scenario object 13c.

Another simulator, 14, is operated by a student. This transmits data concerning physical movement of training devices by a student to a verification engine 15. The verification engine 15 interfaces with the rule base 13a to display the lesson in the manner defined by the lesson rule base 13a. It calculates performance measures defined in the lesson rule base 13a. It also records the performance measures into a lesson record 18 and it adapts the display of the lesson in line with the parameters defined in the lesson rule base 13a.

The system 1 also comprises an expert interface 17 linked with a lesson feedback system 19. Lesson records 18 saved by the verification engine 15 are processed by the feedback system 19 which provides feedback to the expert interface 17 and to a student interface 20.

In more detail, the following describes the components of the system 1.

Analysis Engine 12

This loads the 3D scenario object 13c and performs an analysis of the motion patterns of the expert to extract rules, regions of interest, steps of the lesson and expected performance levels of the students. These are encoded by the engine 12 into the lesson rule base 13a.

Development Interface 16

This provides a non-programmer interface to the features of the training simulator.

To the learning system 13 it allows the expert to fine-tune the rule base 13a by modifying, adding or deleting items encoded in the rule base. It also allows the expert to add lesson content 13b i.e. audio, video, or graphical prompts to the student. The lesson content is associated with events encoded within the lesson rule base 13a. This interface also allows the expert to determine the degree to which the verification engine 15 can adapt the presentation of the lesson to the skill level of the student (e.g. provide the student with more or less prompts).

Learning System 13

This is a unit within the system that defines training as a lesson.

It stores and executes a 3D representation of the training scenario 13c. This can be a 3D drawing of a physical object or the 3D representation of the internal organs that will be used in a graphical simulation.

It contains the lesson rule base 13a which encodes the rules, regions of interest, steps of the lesson, expected performance levels of the students, and determines the degree to which the lesson can be adapted for student skill level.

The system 13 also contains lesson content 13b including audio, video and graphical elements that will be used in the lesson to provide the training and give prompts to the student in the course of the lesson.

Verification Engine 15

This displays a lesson object in the manner defined by the lesson rule base 13a. Also, it calculates the performance measures defined in the lesson rule base 13a, and it records the performance measures into the lesson record 18. It adapts the display of the lesson object 10 in line with the parameters defined in the lesson rule base 13a. The verification engine adapts the level of support or prompts given to the student on the basis of their experience level and their on-going performance level. Thus, a student who is gaining proficiency will be provided with less support. Thus instruction fades as the student gains competence in the task.

Lesson Records 18

These are the lesson records of the student's interaction with the lesson object 10. They contain 3D motion information, video and graphical records, performance metrics and questionnaire answers.

Lesson Feedback Engine 19

The lesson feedback engine 19 provides a range of feedback features to allow an expert to provide feedback and guidance to the student remotely, controlling expert-student interaction at the interfaces 17 and 20. The main feedback features are:

a feedback play bar, described below, subjective and overall grading, and overall lesson feedback messages.

Expert Feedback Interface 17

The expert feedback interface 17 to the lesson feedback engine 19 allows the expert to provide detailed feedback to students by overlaying graphics, text, and audio feedback onto the records 18 of the student lesson. The expert can also provide the student with links to example video/animations that illustrate the issues being raised by the expert. The expert can also provide overall grading on the lesson. This could also be performed live and interactive across a network.

Student Interface 20

The student interface allows the student to access the expert's feedback in their lesson records. The experts' feedback on their lesson can be accessed via the play bar or ancillary displays.

Figure 2:
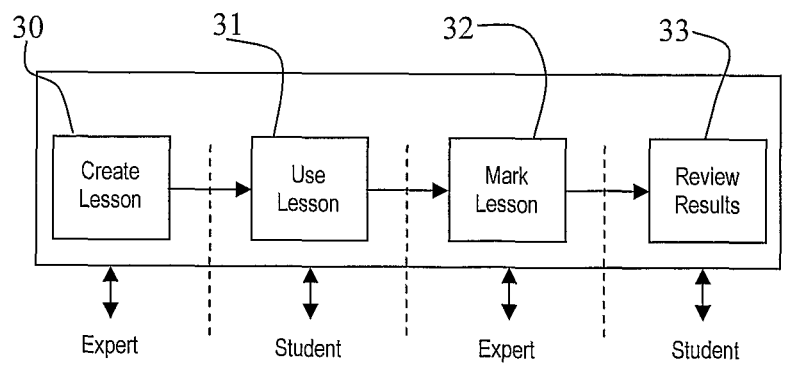
FIG. 2 is a flow diagram of a method performed by the system for generating and using a training module.

Referring to FIG. 2, the system 1 implements a method including the steps of:

30, creating a lesson (object 10, being a combination of a rule base 13a, a content object 13b, and a 3D scenario object 13c), 31, using a lesson with the simulator 14, 32, marking a lesson by the verification engine 15 or the feedback engine 19, 33, reviewing results with the student interface 20 and the feedback engine 19.

This system 1 automates to a large extent the process of creating surgical training content. Many of the skills are difficult to describe in words or diagrams as they are dynamic and physical in their nature. Consequently, they are difficult to teach in any manner other than in the direct mentoring or apprentice model of education. Due to limitations in time available for teaching this model is increasingly difficult to support in surgical training and similar domains.

The training simulator 11 tracks the motion of at least one device such as an instrument (or hand) with respect to a training scenario. The scenario (represented by an object 13c) may be a physical object, an entirely computer generated graphical scenario, or a video combination of both.

The manner in which the student interacts is evaluated by the verification engine 15. The student's interaction is scored on the basis of the rule base 13a. However the engine 15 may also provide the student with "hints" or prompts, the display of which is controlled by parameters in the rule base 13b. These "hints" may be graphical, video, audio or textual.

Applied to the specific embodiment of surgical training, the method of generating a lesson involves initially defining a particular surgical procedure or critical task. This can include defining graphics and creating video animation sequences or constructing a physical object that is accurately described by a 3D scenario file such as a CAD (computer aided design) file of the object 13c. The expert designs the training scenario to be used. This scenario may be a physical task that will be monitored. It may be a virtual 3D model that the students interact with via a computer interface or by means of a motion tracking system based on video, magnetic, inertial or other means. It may be a combination of the 3D model blended with a physical task to create an augmented reality scene with which they must interact. The scenario, whether virtual reality, physical reality, or augmented reality forms the basis of the lesson structure.

The scenario is loaded into the simulator 11 and the lesson rule base 13a is created. Using the simulator 11, the expert interacts with the scenario and an automatic analysis of the expert's path infers the regions of interest, dwell times, and motion characteristics. The expert can add rules manually using the interface 16 if they wish by defining the three dimensional space around the task model and assign measurements and rules associated with these regions.

The automatic analysis of the expert's path generates a lesson rule base 13a by segmenting the path of the surgeon according to features such as changes in motion pattern, and changes in spatial location of activity. The expert can view and modify this automatically-generated lesson script and augment each step of the lesson script with video, graphical or audio information to guide the student toward their goal or to provide proximal feedback on errors.

Lesson adaptivity is then defined as a set of responses to a learner model, to learner retries, and to tutor parameters. The lesson behaviour can be adapted to a location by allowing an expert to set parameters, thresholds, pass/fail levels, and the order and flow of the elements of the lesson via the interface 16. The lesson behaviour is also affected by the personalisation information set by the user such as skill level, results of perceptual and psychomotor tests, and the number of previous attempts, performance level, and errors to create a natural and tailored learning experience.

A lesson containing a 3D scenario object, a rule base, and a multimedia content object is represented by a lesson object 10. This lesson object 10 can then be loaded into suitably licensed versions of the training system, and thus a tutor is able to protect their content from unauthorised duplication.

The analysis engine 12 analyses the motion patterns of the expert as follows to automatically generate a lesson rule base 13a.

Identify regions of interest in the training scenario.
  a. A post-facto analysis of the expert's motion is used to identify spatial locations of high significance. An automatic clustering technique, in this embodiment iterative k-means, produces estimates for the regions of highest significance. Constraints such as typical cluster size and maximum and minimum number of clusters are used to ensure effective clustering.

Identify the steps of the lesson.
  a. Motion pattern analysis is used to segment the steps of the lesson using measures such as velocity change, large spatial changes, and speed changes. These features of motion are used to classify "gestures" such as repetitive motions using computational structures such as Hidden Markov Models (HMMs). The syntax of the gestures are analysed to identify natural breaks in the flow indicating a new step. Typical "break" gestures are "rest", changes in the dominant hand, and changes of instrument.

Generate rules with respect to motion patterns in the context of the steps and regions of interest of the training scenario.
  a. Rules are generated with respect to overall motion statistics: The motion of the expert is processed in each of the regions of interest and steps of the lesson to determine the expected performance levels in terms of metrics such as time, path length, and efficiency of movement. The mean and variance of the expert is used to drive rule generation. For example, depending on the student's expected skill level, performance falling 2 standard deviations from the mean would generate an audio or text warning message.
  b. Rules are generated with respect to spatial motion patterns: the sequence of motion "gestures" within a step. Out-of-sequence motions or invalid gestures generate warning messages in the verification engine 15 or are recorded in the lesson records 18.

The expert uses the interface 16 to manipulate the automatically-generated lesson object 10 to fine-tune items such as the number of steps and regions of interest and turns on or off particular rules to be used. In this phase the expert also has the opportunity to load audio, video or graphical lesson content to the content object 13b that will be presented to the student. The presentation of this content to the user may be triggered by user input such as pressing a foot pedal, a step transition, or an error being detected.

The student interacts with the lesson object 10 via the training simulator 14 and the verification engine 15. The verification engine 15 executes the lesson object 10 and verifies that the student is completing the lesson steps. The verification engine 15 also controls the display of learning content based on the rules contained in the lesson object 10. It creates a lesson record 18 that contains the information specific to the student's interaction with the lesson object 10. This may contain a video or graphical record of the interaction of the student with the training scenario.

After the student has completed the lesson the expert has an opportunity to perform an offline review of their performance using the lesson feedback engine 19. In addition to the automatically-generated metrics of performance it is useful for experts to provide subjective feedback to students. This is achieved by allowing the expert to overlay graphics, text and audio on the lesson record 18 for later review by the student. Each of the instances of feedback provided by the expert is recorded on a displayed play-bar of the lesson feedback engine 19. The student reviews the expert's feedback by using the play-bar, described below, to skip to each instance of feedback.

Figure 3:
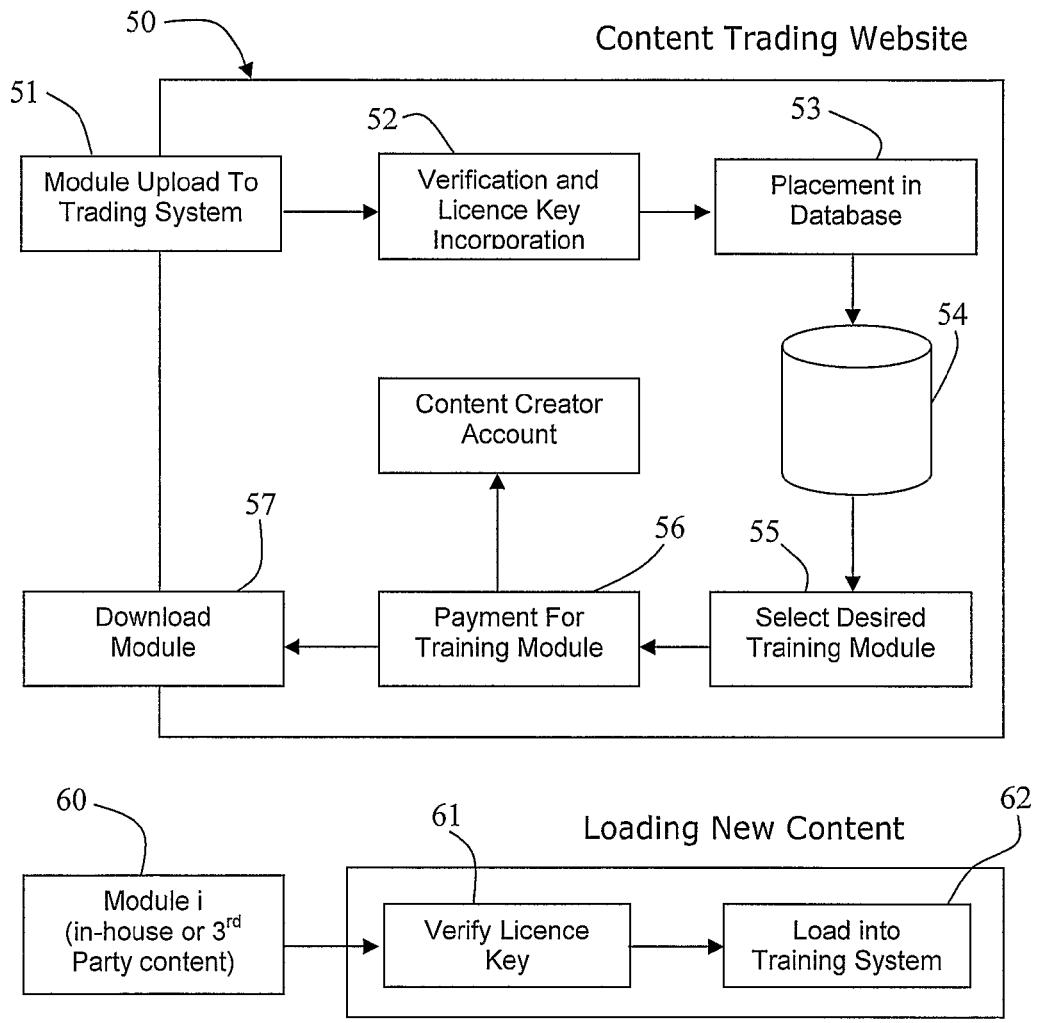
FIG. 3 is a flow diagram for creating training modules, for operation of a content trading website, and for loading new content.
Figure 4:
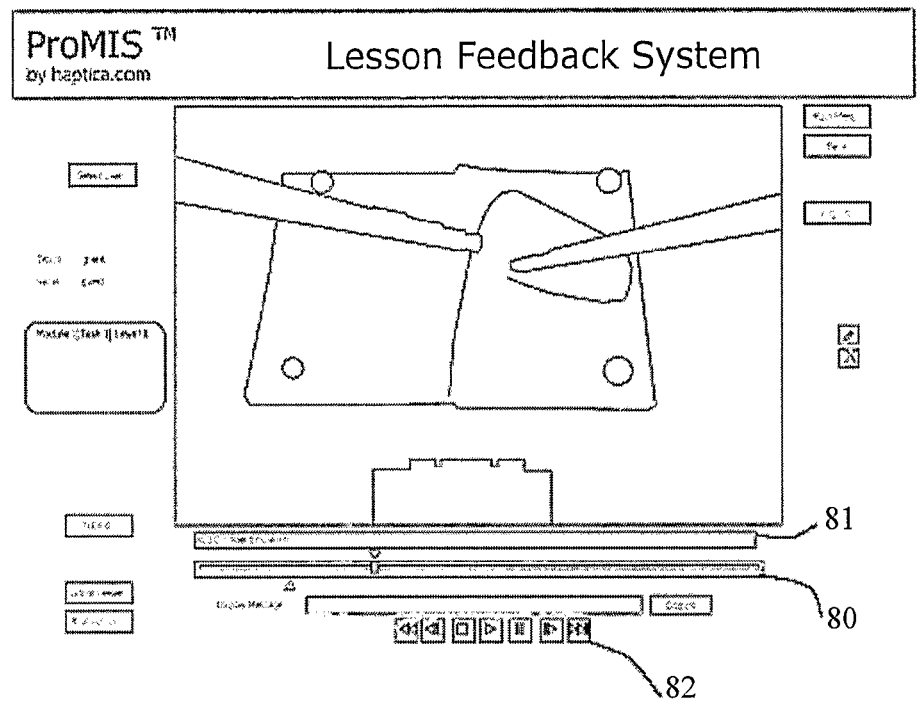
FIGS. 4 to 6 are sample display screens for tutor-student interaction with a course.

A number, X, of lesson objects (or "training modules") are generated in the manner described above. Referring to FIG. 3, they are uploaded in step 51 to a Web server 50, where they are verified and registered with a license key in steps 52 and 53 in a database 54. A mechanism on the server performs selection 55, payment processing 56, and transmission 57 to a requesting client system. For selection, the modules 1-X are retrieved from a database 21 of the server 20.

The server 50 includes a mechanism whereby a tutor can upload 60 a module to the web site. Prior to being made available, the lesson is verified as correct and licensing keys are verified in step 61 and loaded in step 62. Users of the training system may download or have dispatched to them new training modules after payment of the appropriate fee. The license key embedded within the module supports outright licensing of content as well as supporting a pay-per-use charging model.

Referring again to FIG. 2, the system 1 in step 31 automatically provides immediate or proximate feedback during a lesson or summative feedback at the end of a lesson. The degree to which summative or proximate feedback is used is a configurable parameter of the system 1.

The verification engine 15 and the feedback engine 19 perform automatic analysis of the movement patterns of the student against the rules. For example, the student must keep the instrument tip within the field of view of the camera at all times, or while suturing the instrument tips should not move outside a sphere of 15 mm diameter centred of the suture point. Automatic analysis may also involve statistical analysis of the path the instruments take and compare these statistics with those produced by students of different skill levels.

This analysis allows the student to conduct a self-assessment by asking them to compare their performance with reference examples of good and poor performance, and record this assessment.

Figure 5:
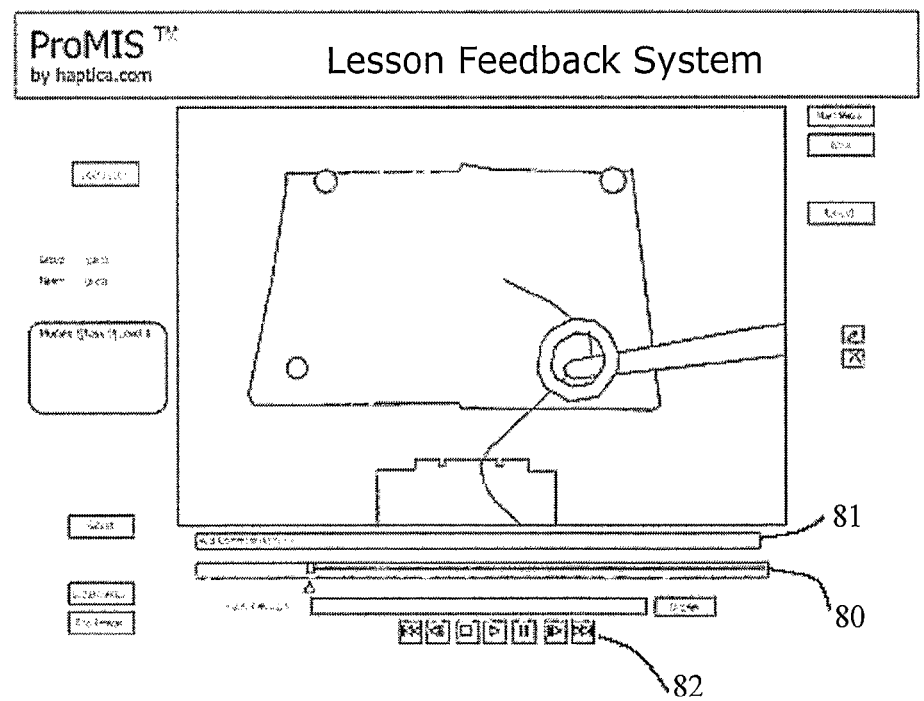
Figure 6:
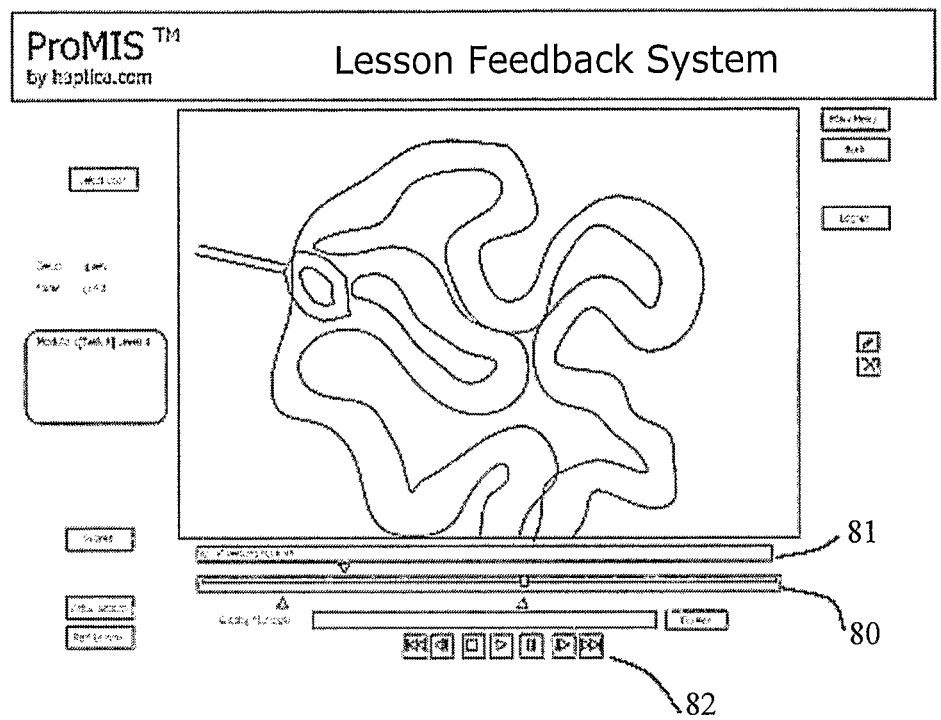

Sample displays for the tutor to provide feedback are shown in FIGS. 5 to 7. A video sequence of the task is played, and at any chosen point on a play-bar 80 the tutor may provide an interactive input. There are three forms of such input, namely, image editing an overlay such as circling the tip of the instrument or visually demonstrating a point as a text comment into a box 81, or recording an audio clip using a toolbar 82. At each input the system records the exact point in the video sequence and the student can immediately re-start the sequence at the point using the play-bar 30.

The feedback engine 19 links position information with the frames of the video/graphics in the student video. This meta-information can be added to by the expert to carry feedback messages. Because the information is encoded at a low level in the data stream it can be indexed by the engine 19. These indices are displayed on the play-bar.

The feedback messages are visually indexed on the play-bar. Tools allow the student to sequentially jump to each feedback message without the requirement to view intermediate sections. The student may also select any feedback index or point in the lesson data stream using a pointing device.

It will be appreciated that the invention provides for comprehensive learning of physical tasks without need for an expert to be physically present. It automatically generates a lesson, verifies student performance in real time, and also provides a platform for experts to give feedback either in real time or for later playing by the student.

The invention is not limited to the embodiments described but may be varied in construction and detail. For example, it may be applied to training in other domains in which physical movement is involved such as for example aircraft maintenance procedures.

The invention claimed is:

1. A training module system comprising:
   an analysis engine configured to receive motion data from a simulation exercise performed by a first user and generate rules based on the motion data of the simulation exercise; and
   a learning system configured to couple the rules from the simulation exercise with training content to generate a lesson for a second user;
   wherein the analysis engine is configured to execute an automatic clustering technique to identify spatial regions of interest of movement caused by the first user performing the simulation exercise and is configured to perform automatic pattern analysis to segment the lesson according to motion parameters.

2. The system of claim 1, wherein the learning system is configured to couple the training content and the rules with a 3D scenario object.

3. The system of claim 1, wherein the motion parameters are velocity change and spatial change.

4. The system of claim 1, wherein the analysis engine is configured to execute a classifier to classify patterns, wherein the classifier is based on a Hidden Markov Model.

5. The system of claim 1, further comprising a development interface, wherein the development interface is configured to provide editing of the lesson by the first user.

6. The system of claim 1, further comprising a verification engine configured to receive motion data from the lesson and configured to evaluate, against the rules of the simulation exercise, a performance of the lesson by the second user.

7. The system of claim 6, wherein the verification engine is configured to verify the performance of the second user by extracting motion measures from the rules, monitoring values for the corresponding motion by the second user, and comparing them.

8. The system of claim 1, further comprising a feedback engine configured to interface the first user with the second user such that the first user provides feedback on the performance of the lesson by the second user.

9. The system of claim 8, wherein the feedback engine is configured to play a video sequence of the lesson and is configured to record feedback from the first user during said playing.

10. The system of claim 9, wherein the feedback is linked with a time on a play-bar generated by the feedback engine, and wherein the system initiates playing of the video sequence at a time on the play-bar selected by the second user.

11. The system of claim 10, wherein the feedback includes one or more of a visual overlay on the video sequence, a textual comment, and an audio comment.

12. The system of claim 1, further comprising a first training simulator and a second training simulator, wherein the simulation exercise is performed on the first training simulator, and the lesson is performed on the second training simulator.

13. A training module system, comprising:
   an analysis engine configured to receive motion data from a simulation exercise performed by a first user and generate rules based on the motion data of the simulation exercise;
   a learning system configured to couple the rules from the simulation exercise with training content to generate a lesson for a second user; and
   a feedback engine configured to interface the first user with the second user such that the first user provides feedback on the performance of the lesson by the second user;

wherein the analysis engine is configured to execute an automatic clustering technique to identify spatial regions of interest of movement caused by the first user performing the simulation exercise and is configured to perform automatic pattern analysis to segment the lesson according to motion parameters.

14. The system of claim 13, wherein the motion data includes changes in velocity and location of an instrument manipulated by the first user in the simulation exercise.

15. The system of claim 13, wherein the simulation exercise and the lesson are a surgical training simulation.

16. The system of claim 13, further comprising a development interface configured to provide editing of the lesson by the first user.

17. A training module system, comprising:
a first training simulator;
a second training simulator;
an analysis engine configured to receive motion data from a simulation exercise performed on the first training simulator and generate rules based on the motion data of the simulation exercise; and
a learning system configured to couple the rules of the simulation exercise with training content to generate a lesson to be performed on the second training simulator;
wherein the analysis engine is configured to execute an automatic clustering technique to identify spatial regions of interest of movement caused by the first user performing the simulation exercise and is configured to perform automatic pattern analysis to segment the lesson according to motion parameters.

18. The system of claim 17, wherein the motion parameters are velocity change and spatial change.

19. The system of claim 13, wherein the motion parameters are velocity change and spatial change.

* * * * *